United States Patent Office 3,421,305
Patented Jan. 14, 1969

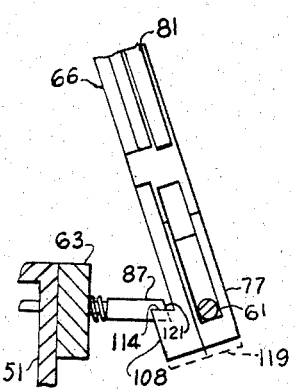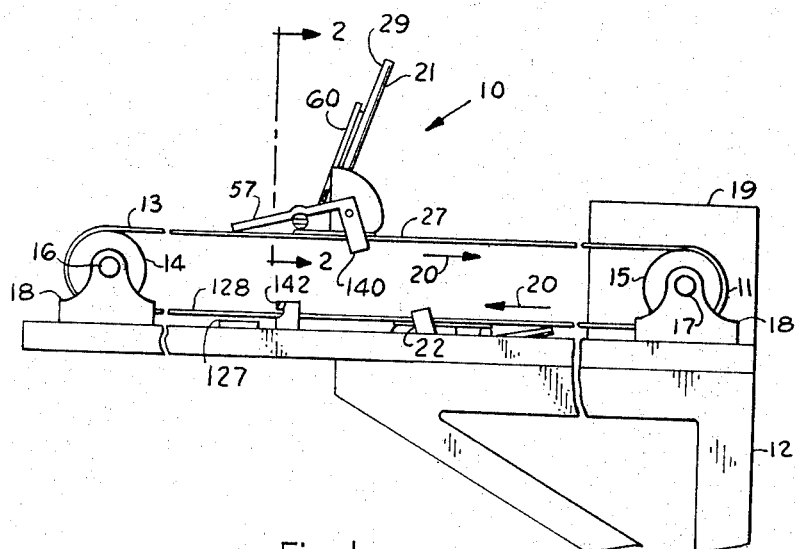

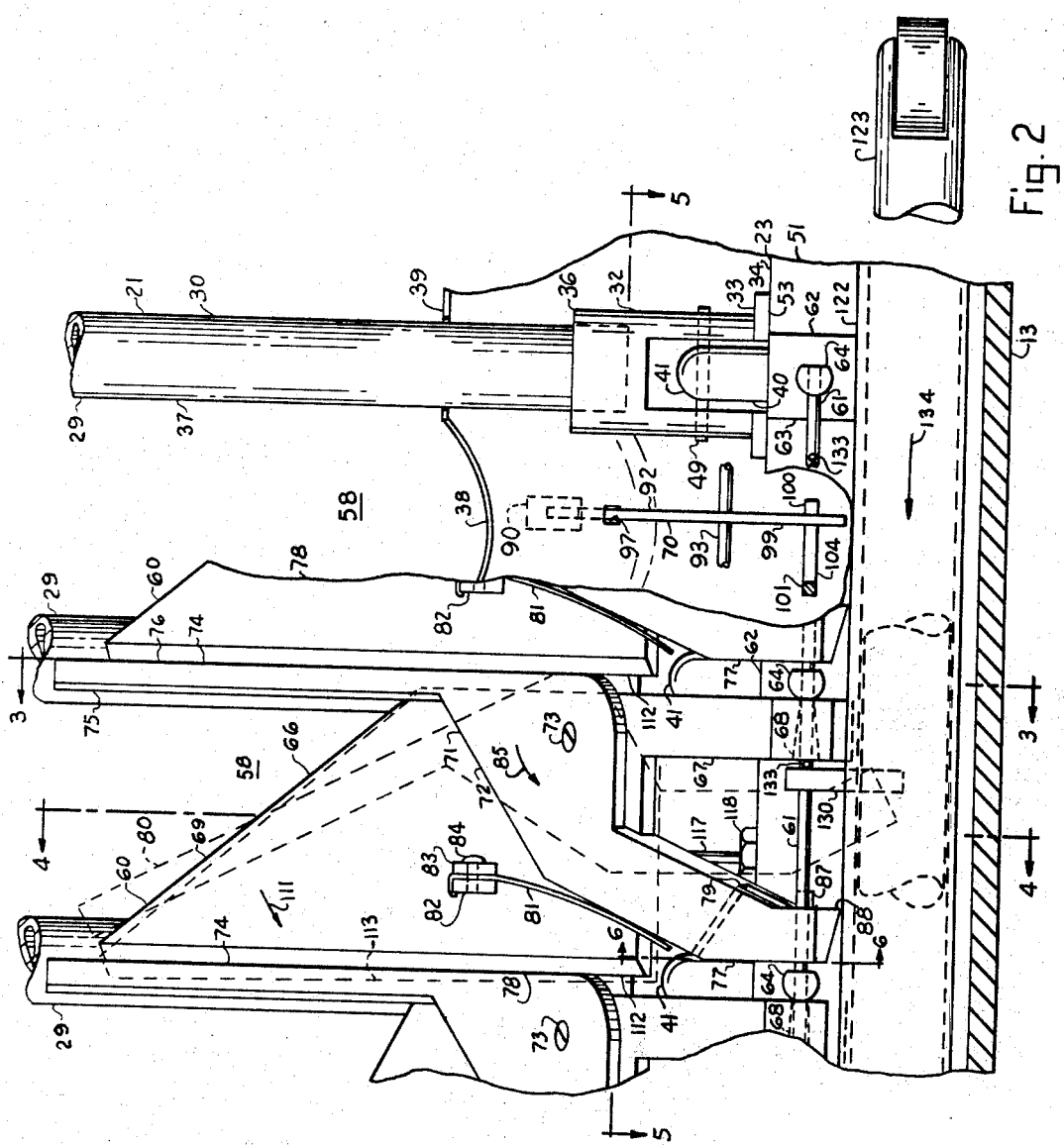

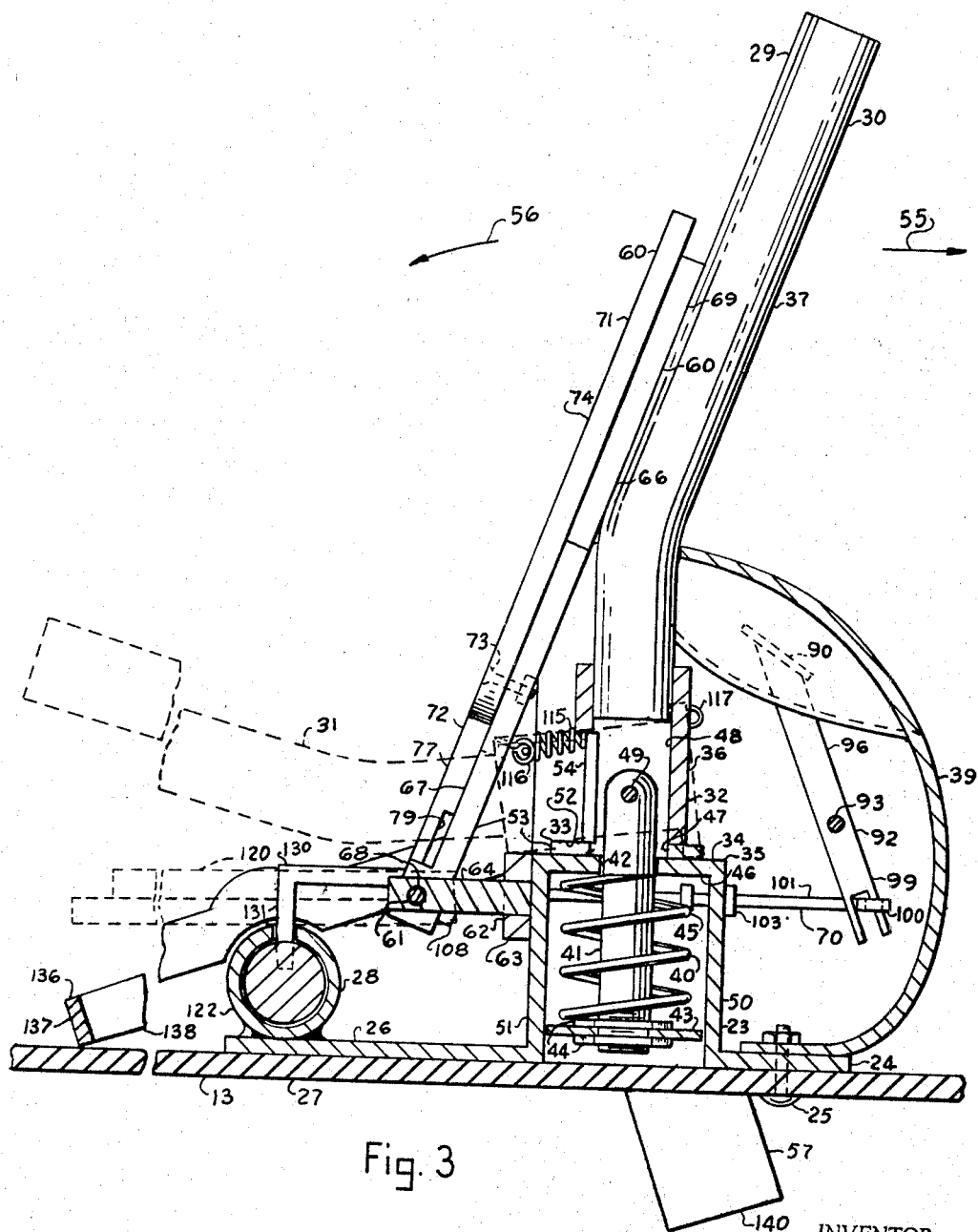

3,421,305
FRUIT PICKING APPARATUS
Joel P. Phillips, Jr., Winter Park, Fla., assignor to Phillips Harvesting Co., Winter Park, Fla., a corporation of Florida
Filed Aug. 1, 1966, Ser. No. 569,291
U.S. Cl. 56—328
Int. Cl. A01g 19/00
10 Claims This invention relates to improved apparatus for picking tree grown fruit.

A general object of the invention is to provide an improved apparatus for picking citrus fruits, such as oranges, tangerines, lemons, etc.

Citrus fruits are commonly picked by hand, and in the case of tangerines, tangelos and the so-called mandarin fruits, it is almost universal practice to use hand manipulated cutting devices to sever the fruit from the tree because of the plugging problems that are encountered when the fruit is merely pulled from the branch. Plugged fruit is fruit in which a small area of the skin has been removed from the body portion as the stem portion was separated from the body. This is objectionable for it exposes the meat of the fruit to the elements and creates a breeding area for bacteria and insects that renders the fruit unacceptable to processors and packers.

The problem of plugging is not limited to the types of citrus mentioned but is also an important consideration in picking oranges, lemons and other citrus varieties. While these types of citrus have a greater tendency to resist plugging than do the softer skin citrus fruits plugging nevertheless does occur in an appreciable portion of the harvest and especially when the fruit is picked in a riper condition or during periods of hot weather.

Mechanical fruit picking devices have been proposed to minimize the labor required for harvesting purposes but such devices have met with no appreciable success for various reasons. For one, most of the devices have either been found to cause excessive damage to the trees during use or have been uneconomical and impractical for other reasons. In addition most of the mechanical picking devices fail to resolve the plugging problems and in fact tend to increase the amount of plugging that occurs.

One object of the invention is to provide improved fruit picking apparatus which minimizes the problems of plugging.

The invention described herein relates to improvements in mechanical fruit pickers of the kind having spaced elements which are moved through the flexible branches in the crop laden area of a fruit tree and which cooperate in severing the fruit from the tree by trapping the fruit at the advancing side of the elements. The elements are variously named in the art but are usually called "fingers" because of their elongated nature. The fingers in such equipment are spaced apart so that a combing or raking action transpires as the equipment is used with the flexible branches tending to orient themselves so as to pass through the spaces between the fingers while the fruit is nevertheless being trapped.

The fingers in prior art equipment are frequently rigid and fixed in suitable working positions in the equipment, while in other cases the fingers are flexible in nature, the latter types being advocated to reduce tree damages and to better facilitate the combing action. Certain concepts of the invention may be used to improve such prior art finger type fruit picking equipment. However, I have found that the amount of damage to the fruit trees caused by the use of finger type equipment can be reduced by using fingers that are capable of pivoting out of their working positions in the equipment when an unyielding obstruction is encountered in the tree growth as is seen in my co-pending application, Ser. No. 513,016 filed Dec. 10, 1965 and entitled "Fruit Picking Apparatus and Improvements Therein." Hence one object of the invention is to provide improvements for finger type fruit picking equipment of the type contemplated by my co-pending application and wherein the improvements are directed to minimizing the amount of fruit plugging which occurs.

Yet another object is to provide improvements in citrus fruit picking equipment that enables the use of the equipment for picking the softer skin citrus fruits such as tangerines, tangelos and the like.

In accord with the invention a cutting device is provided for severing the fruit from the tree and the cutting device is controlled in its operation by a device for detecting the fruit which is trapped by the fingers and which is also attached to the tree. The tree attached fruit is detected by cooperating sensing components which sense both the body portion and the branch attaching stem portion of its fruit. The cutting device is actuated in response to the detection of both the body and stem portions of the entrapped fruit and has a blade element in the preferred embodiment which is caused to cut the sensed stem portion in the process of severing the fruit from the tree.

One aspect of the invention relates to providing a mounting for the cutting device which adapts the device for use with fingers of the type structure shown in my co-pending application, provision being made for the cutting devices to be knocked down with the fingers as when the latter encounter an unyielding growth structure in the tree.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevational view of an apparatus which embodies the concepts of the invention, certain portions being broken away or otherwise removed;

FIG. 2 is an enlarged elevational view of a fragment of a fruit picking assembly seen in FIG. 1 with certain parts broken away to expose hidden structure;

FIG. 3 is a vertical section view taken generally along the lines 3–3 of FIG. 2;

Figure 5:
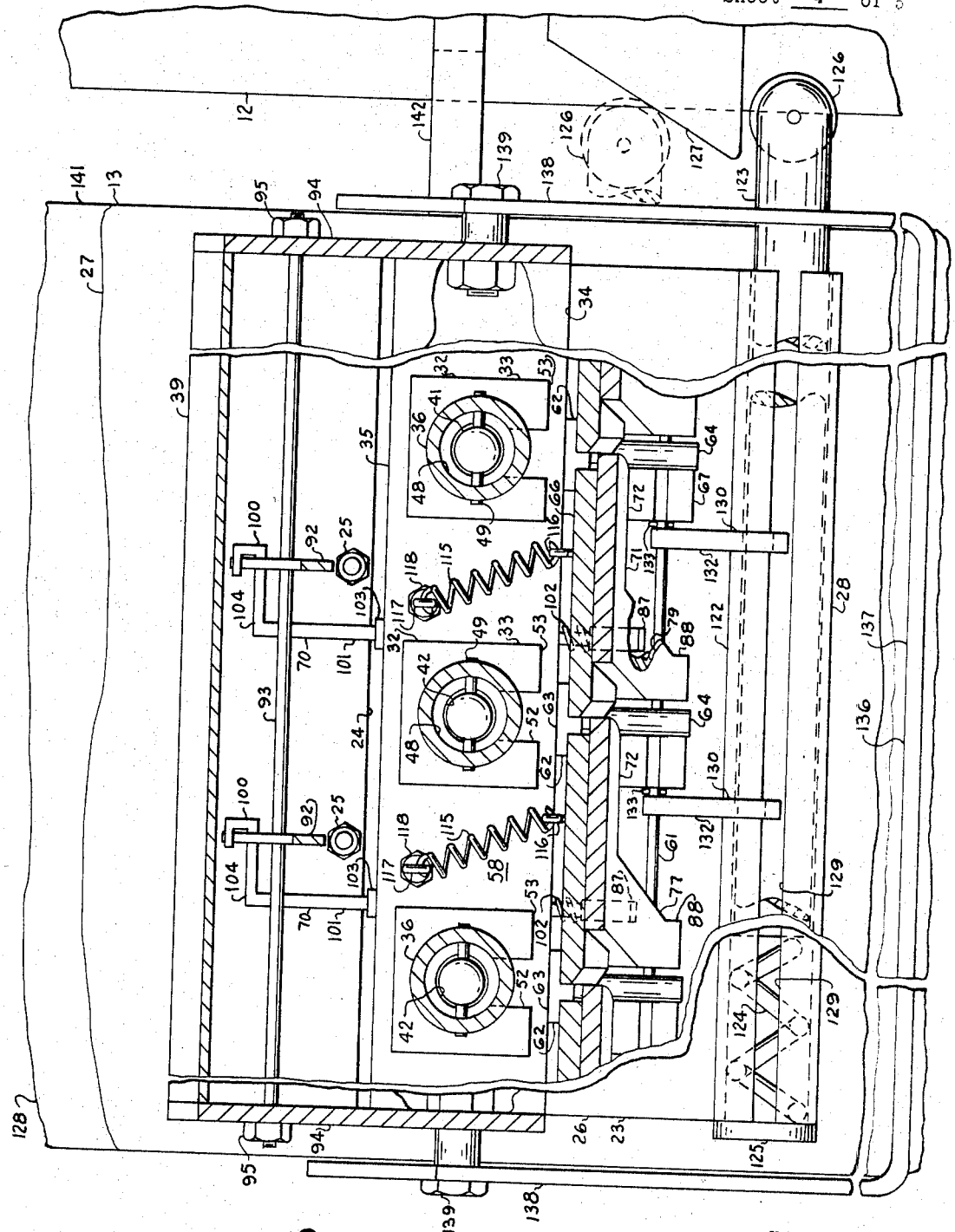

FIG. 5 is a horizontal section view as taken generally along the lines 5–5 through the fragment seen in FIG. 2 and also shows additional structure at the opposite ends of the assembly with certain parts being broken away or removed to expose other hidden components; and FIG. 6 is an elevational view of a fragment of one of the cutting devices shown in FIG. 2 together with adjacent structure, the view being taken generally along the lines 6—6 and shows a catch component of the apparatus as the catch is seen in a retracted position it may assume.

Now with reference to the drawings, an apparatus which embodies the concepts of the invention is generally designated by the numeral 10. This apparatus includes a fruit picking mechanism 11 which is mounted on a suitable rigid frame 12. Frame 12 may be connected to and supported on any suitable lift mechanism which is adapted to maneuver the picking mechanism into and out of the crop laden area of a fruit tree and to orient the picking mechanism for use in harvesting crops. Lift mechanisms of this kind are well known in the art and are usually self-propelled or mounted on appropriate vehicles for movement in the grove areas.

The picking mechanism 11 has a continuous belt 13 which is trained over spaced rolls 14 and 15. These rolls 14 and 15 are mounted on shafts 16 and 17 that are journaled at their opposite ends in bearings 18 which are in turn fixed on frame 12. A motor 19, preferably of the fluid kind commonly used in field equipment, is mounted on frame 12 and drivingly coupled to shaft 17. The arrangement is such that belt 13 is driven in the direction of arrows 20 when the mechanism is in use.

Belt 13 supports a plurality of fruit picking assemblies, two of such assemblies being shown in FIG. 1 and designated at 21 and 22 respectively. The belt serves, when the frame is maneuvered to position the mechanism in the crop laden area of a fruit tree, to move the assemblies through the crop laden branches as in the direction of arrow 55.

Each picking assembly has an inverted channel type support component 23 on which the other components of the assembly are supported. Channel 23 is an elongated member that extends transversely of belt 13 and it has a rigid flange 24 at the leading side of the assembly. Here the assembly is bolted to the belt 13 by spaced bolt type fasteners designated at 25. The rolls 14 and 15 are provided with suitable grooves, not shown, to enable free passage of the belt over the roll surfaces without interference from the rounded heads of these fasteners. Bolts 25 also serve to fasten an arcuate guard plate 39 of the assembly to the support component thereof. The channel component 23 also has another flange 26 at the trailing side of the assembly. Flange 26 rests on the belt 13 when the assembly is moved along the top flight 27 of the belt, and serves to support a device 28 which is used in cocking certain spring loaded cutting devices designated at 60. Fasteners 25 are spaced apart in a linear arrangement across the belt, and by virtue of the arrangement, the rear flange member 26 lifts off the belt as the assembly passes around the periphery of the rolls 14 and 15.

Each fruit picking assembly has a plurality of fingers 29 which are spaced apart in the assembly and arranged in a row that extends transversely of the belt. Each finger is individually connected to the support component 23 by a separate spring loaded device 40 that enables the finger to pivot out of its working position in the arrangement when the finger encounters an unyielding obstruction in its path of movement. The working positions for the fingers 29 are shown in solid lines and designated at 30 in the drawings, whereas the nonworking positions for these elements are indicated by reference to the broken line position for the finger shown in FIG. 3 at 31.

Figure 4:
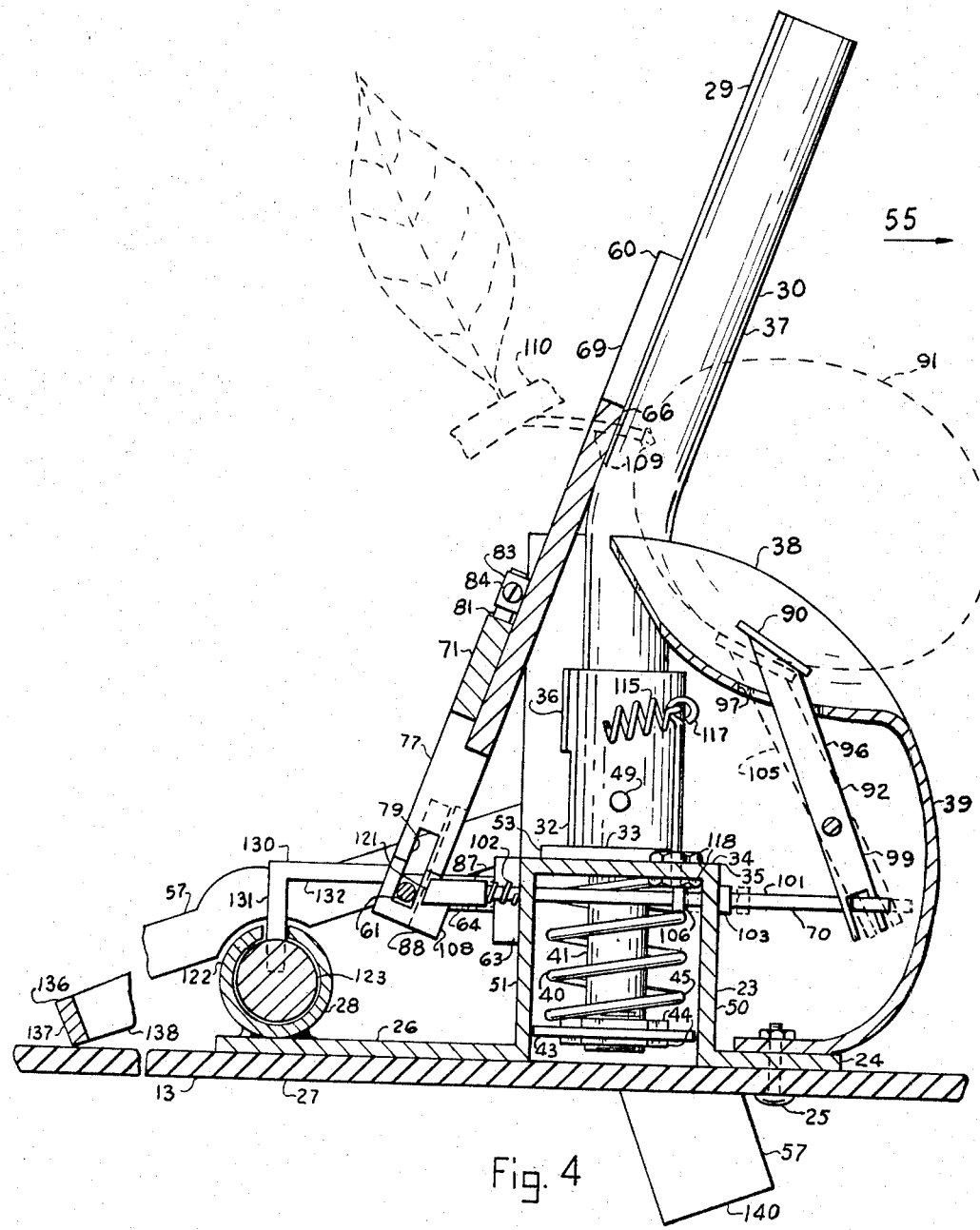
FIG. 4 is another vertical section view which is taken generally along the lines 4—4 of FIG. 2.

Each finger has a base section 32 that includes a flat rectangular metal plate 33. This plate rests on the upper surface 34 of the top channel section 35 when the finger is in its working position in the arrangement. Plate 33 supports and is fixed to an upright cylindrical sleeve component 36 of the base section and the fruit contacting part of each finger consists, in the embodiment illustrated, of an elongated tubular element 37 which fits in the upper end of the sleeve, as shown in FIG. 3. Element 37 is welded to the sleeve 36 and is bent, as seen in FIGS. 3 and 4, so as to incline toward the front or leading side of the assembly. This arrangement enables the fingers to better cooperate in trapping the fruit as the assembly moves through the crop laden area of the tree in the direction of arrow 55 and also serves to guide the tree attached fruit into the pockets or recesses that are provided in the guard plate 39 immediately in front of the spaces between the fingers.

The spring loaded connectors 40 serve to retain the fingers in the working arrangement under the normal resistances encountered in detaching the fruit from the tree but are provided with springs that yield to permit the fingers to pivot rearwardly of the assembly when the fingers encounter excessive resistance to forward movement in the way of unyielding limbs, branches and the like. Each device 40 has a metal pin 41 that extends vertically through a suitable aperture 42 in the top section of the channel. The lower end of the pin 41 carries a rectangular member 43 between a pair of nuts 44 that are threaded on the end to secure the member 42 to the pin. A spring 45 is coiled about the pin 41 between plate 43 and the undersurface 46 (FIG. 3) of section 35. This resilient member 45 is under compression so that pin 41 is being constantly urged toward belt 13. Plate 33 of section 32 has an aperture 47 (FIG. 3) which enables the upper end of pin 41 to extend into the hollow portion 48 of the sleeve component 36 of the finger. Here pin 41 is pivotally connected to the sleeve 36 by a pivot pin 49 that establishes an axis for pivotal movement of the finger between the working and nonworking positions therefor. The axis of pin 49 extends transversely of belt 13 and the front and rear edges of the rectangular plate 43 are such as to be in close proximity to the front and rear side walls 50 and 51 of the channel component 23. This arrangement closely limits rotation of pin 41 about its longitudinal axis and thus restricts changes in the transverse arrangement of the pivot axis established by pin 49 for the finger.

The base plate 33 of each finger has a slot 52 that extends between the trailing edge 53 of the plate 33 and the aperture 47 therein, and the wall of the cylindrical sleeve 36 has a cutout 54 above the slot 52, all to accommodate movement of the pin 41 and the location of its upper end when the finger has been knocked down into the nonworking position 31. When the finger encounters an unyielding obstruction as it advances in the direction of arrow 55, it is caused to pivot about the axis of pin 49 in the direction of arrow 56. As it starts this pivotal movement, the finger rides up on the trailing edge 53 of plate 33, and this causes pin 49 to move vertically against the compressive forces of the coiled spring 45. As the finger continues to pivot out of its working position 30 in the arrangement, the edge 53 slides forwardly on the upper surface 34 toward the advancing side of the assembly. Once the edge 53 has passed beneath the pivot axis for the finger, spring 45 aids further pivotal movement of the finger into the nonworking position. Here the spring loaded connector 40 serves to retain the finger until such time as it is again set up into the working position by the yoke type set up mechanism 57 of the assembly and which will be subsequently described.

In carrying out their intended function of trapping of the fruit, the fingers 29 operate in pairs with the fruit being trapped at the leading side of the assembly and generally in the space 58 between the cooperating fingers. In trapping the fruit, the fingers operate in accord with the principles of a rake or comb with the flexible branches in the crop laden area of the tree being straddled by adjacent fingers as the assembly advances through the area. As such, the flexible branches tend to align themselves in a manner such as to pass through the spaces between the fingers while the fruit is trapped in the space at the leading side of the assembly.

The cutting devices of the fruit picking assemblies are designated at 60 and are located at the trailing sides of the fingers. These devices 60 are mounted for pivotal movement about the axis of a rod 61 that extends across the belt and are yieldably retained in their working positions by tension springs 115. The rod 61 is supported spacedly above the rear flange 26 of component 23 and is carried on a plurality of spaced mounts 62 that are fixed to the back wall 51 of component 23. Each mount is in back of one of the fingers and has a rectangular base plate 63 which is welded to the upright back wall 51. The mount also has a solid cylindrical component 64 which has a sector removed at the pivot arm side of the adjacent cutting device and which is fixed to the base plate 63 of the mount in a manner such that it projects rearwardly from the back wall 51 over the flange 26. Each cylindrical component 64 has an aperture at its rear end and rod 61 extends through the aligned apertures and is fastened in place by end nuts, not shown.

The cutting devices are supported on rod 61 between the cylindrical components 64 of the mounts 62. Each device 60 has a flat rigid metal plate 66 that is cut out to provide an arm 67 which holds the main portion of the plate offset from the pivot axis for the cutting device. The bottom end of arm 67 is enlarged to facilitate providing a tapered bore 68 through which the rod 61 extends in the assembled apparatus. The upper edge portion 69 of component 66 is cut on an incline, as shown in the drawings, and serves as one of the blade elements of the scissors-like cutting device. This edge is not sharpened in the illustration because of its location in the space between the fingers when the device is in its working position and whereat damage to the branches would otherwise occur if the blade had a sharp edge. As will be subsequently seen, this edge 69 also serves as a sensing component of a device 70 associated with the cutting device and which is provided for detecting the tree attached fruit that is entrapped by the fingers in front of the cutting device.

Each cutting device 60 also has another flat rigid plate like component 71 which is pivotally connected at its mid section 72 to the other plate 66 by a screw type fastener 73. The upper portion of component 71 consists of a narrow elongated blade section 74 that is provided with a sharp edge 75 which cooperates with edge 69 in shearing and thus cutting the stem portion of the entrapped fruit when the cutting device is actuated. This blade portion 74 of component 71 is preferably shielded by the adjacent finger, as when the blade is in the open position 76 shown in solid lines in FIG. 2, so that during advancement of the fruit picking assembly, a minimum amount of contact occurs between the knife like edge 75 and the branches that pass through the space 58 as the combing action transpires.

At the opposite side of the pivot axis for blade 74, component 71 has a pivot arm 77 which is pivotally moved when the cutting device is actuated. Beneath the main section 78 of component 66, arm 77 is somewhat thicker than the mid and blade sections of the plate 71 so as to enable providing a slot 79 through which the rod 61 also extends. This slot is adapted to accommodate the pivotal movement of the pivot arm and provisions for the rod 61 to extend through arm 77 are made so as to retain the arm in working alignment with a catch 87 to be subsequently described. The other arm 67 of the cutting device is restricted in axial movement on rod 61 by a pin 133 that is offset from the arcuate side of the adjacent mount component 64. Pin 133 is sufficiently spaced to permit the cutting device to pivot in the general plane of plates about an auxiliary axis for pivotal movement of the device and which is established at the narrow end of the tapered bore to facilitate the desired action indicated hereinafter for sensing the stem portion of the fruit.

As previously indicated, the pivot arm 77 of cutting device 60 is caused to pivot toward arm 67 about the axis of element 73 when the fruit is being severed from the branch. When this happens the blade 74 pivots from the open position 76 to a closed position indicated by reference to the broken line position 80 for the plate 71 seen in FIG. 2. The driving force for pivoting the knife blade 74 from the open position to the closed position is provided by the leaf spring 81. This resilient actuator 81 for the device is clamped at its upper end between a block 82 appropriately welded to the rear surface of section 78 and another block 83 which is releasably secured to the former 82 by a screw element designated at 84. The upper end of leaf spring 81 bears against the outside edge of arm 77 and constantly urges component 71 to rotate about the axis of element 73 in the direction of arrow 85 and thus serves to constantly urge the blade into its closed position.

The blade element 74 is releasably retained in the open position by a catch 87 component of the detector 70 and which engages the inside edge 88 of the pivot arm 77 in front of rod 61. The arrangement is such that catch 87 and arm 77 become disengaged when a tree attached fruit is entrapped by the fingers associated with the cutting device and when the fruit is also detected by the detecting device 70 associated with the device. The detection is accomplished when both the body portion 91 and the branch attaching stem portion 109 of the fruit are simultaneously sensed. When this happens, the catch 87 and arm 77 become disengaged and the leaf spring automatically responds to actuate the cutting device and thus moves the pivot arm and the blade 74 from the open to the closed position.

The detecting device 70 has a button 90 in the recess 38 in front of the cutting device and thus button type sensing component of the detector is arranged to sense the body portion of the entrapped fruit as the body portion seats itself in the recess and causes depression of the button. The catch 87 is linked in movement to the button by a connection that involves a lever 92 which is pivotally mounted on a transversely extending rod 93 that is housed behind the guard plate. This rod is supported at its opposite ends in end plates 94 that are fixed at the opposite ends of the support and guard plate components of the assembly, the rod being secured in place by end nuts designated at 95. The pockets or recesses 38 are suitably shaped to accommodate the body portions of the fruit and are located generally in the spaces 58 between the fingers and at the leading side thereof. The upper arm 96 of each lever extends through a slot 97 at the base of the pocket 38 thereabove. The slot is adapted to accommodate pivotal movement of the arm and which comes about from depression of the contact button 90 fixed to the end of the arm 96 when the body portion 91 of the fruit becomes seated in the pocket.

The other arm 99 of each lever is bifurcated at the lower end and is connected to an end loop 100 of a connecting rod 101 that extends through the front and back walls of the support component. The rear end of rod 101 is fixed to the catch 87 and carries a coiled spring 102 which is compressed between the catch 87 and the adjacent rear wall 51 so as to constantly urge the catch 87 in a rearward direction toward rod 61. Rod 101 extends through suitably aligned square holes in walls 50 and 51 and has a stop 103 that is fixed to its front end portion so as to limit rearward movement of the catch under the urgings of the resilient compression spring 102. Rod 101 is offset from the medial line between the fingers as seen in FIG. 5, and the front end portion has a lateral extension 104 that terminates in the loop connection with the bifurcated lower arm portion of the lever.

When fruit becomes trapped between an adjacent pair of the spaced fingers of the picking assembly, the fingers guide the body portion 91 into the frontal recess in the guard plate. Here the body portion 91 contacts and depresses the sensing element 90, causing lever 92 to pivot to the broken line position indicated at 105 in FIG. 4. This draws the rod 101 forward from the extended position shown in FIG. 4 until a second stop 106, fixed to the medial section of the rod 101, engages the inside of front wall 50. Stop 106 is so arranged that forward movement of the catch 87 is limited to the extent that the catch 87 still remains in engagement with the inside edge 88 of the pivot arm when it reaches the retracted position shown in solid lines in FIG. 6.

The bottom end of arm 77 has an integral section 108 that projects generally forwardly when the cutting device is in the working position. This integral section 108 provides an extension to the inside edge 88 of arm 77 and prevents the arm 77 and the catch 87 from becoming disengaged when only the body portion 91 of a fruit is sensed by the detecting device. However, when catch 87 is retracted, as seen in FIG. 6, it is evident that if the upper edge 114 of section 108 drops to a lower position, arm 77 will then become disengaged from catch 87 and permit the leaf spring to actuate the cutter. This is accomplished when the step portion of the attached fruit is sensed through contact with the edge 69 of plate 66. The cutting device 60 is adapted for limited pivotal movement about an auxiliary axis perpendicular to rod 61 and is normally retained by a tension spring 115 in the solid line position shown in FIG. 2. As fruit is trapped by the fingers and drawn down into the pocket, the stem portion 109 encounters the stem sensing edge component 69 of the detecting device 70, and as the picking assembly moves forward in the direction of arrow 55 the branch 110 of the tree flexes and causes the stem to exert a force against the edge 69 and which is sufficient to rotate the cutter 60 in the direction of arrow 111 against the urgings of the retainer spring 115. This causes arm 77 to drop to the fallen position indicated by the broken lines 119 in FIG. 6 and permits the upper edge 114 of section 108 to pass beneath the catch 87 as the spring 81 actuates the cutter.

Pivotal movement of the cutting device in the direction of arrow 111 under the urgings of the stem portion is permitted because of the tapered bore 68 in arm 67 and the slot arrangement provided in arm 77. In general, under the stem pressure exerted against edge 69, cutter 60 tends to pivot about an axis at the narrow end of the bore in arm 67 and generally in the plane of the cutter. The amount of pivotal movement is limited, however, by the taper of the bore so that the side edge 112 of the main section 78 of component 66 assumes the position indicated by the broken line 113 as the catch is released from the arm section 108. It may be noted at this point that component 66 is beveled adjacent the side edge 112 to avoid interference with the pivotal movement by the cutting implement of the adjacent cutting device.

From the foregoing it is evident that edge 69 serves as a stem sensing component of the detecting device 70, and that both the stem sensing edge 69 and the body sensing component 90 are connected in an operating arrangement wherein each must be depressed at the same time as the other in order to effectuate disengagement of the pivot arm and the catch. Thus, when the catch 87 is retracted for reasons that a body portion 91 of a fruit is sensed, and when the stem portion of the fruit is sensed by encountering the inclined edge with sufficient force to cause the device 60 to pivot and drop the edge 114 below the catch 87, the catch and arm become disengaged, enabling the leaf spring 81 to actuate the cutting device and thus cut the stem of the detected fruit.

The cutting devices are held against pivotal movement in the direction of arrow 111 by the retainer springs 115 which are used to retain the cutting devices in their inclined working positions. These springs are under tension and each is fastened at one end to an eye component 116 mounted in the front face of the adjacent cutter component 66. The other end of the spring 115 is fastened to an eye component 117 which is mounted upright in the space between the base section of the fingers. Components 117 are fastened to section 35 by nuts 118 that engage the threaded shanks of the eye components at the bottom and top sides of the section. The arrangement is such that each retaining spring 115 has a moment of force that urges the cutting device, when it is in its working position, to pivot in a direction opposite to arrow 111. Spring 115 thus serves to retain the extension of the inside edge 88 in engagement with catch 87 when the latter is retracted. Spring 115 is of course adapted to yield to the pressure exerted against the edge 69 of component 66 by the stem portion of the attached fruit. Spring 115 also serves to retain the cutting device 60 in its working position and at which it will be noted that the component 66 rests against the back side of the finger adjacent edge 112. The spring again, however, is adapted to yield and permit the cutter to pivot about the axis of rod 61 and into the nonworking position indicated, for example, at 120 when an obstruction is encountered that either causes one or the other of the fingers to pivot into their nonworking position and thus force the cutting device associated therewith into its nonworking position 120, or when the cutting device itself encounters an obstruction forcing the cutting device to pivot into such a nonworking position.

The arrangement of the retaining spring 115 is such that even though the cutting device is knocked down into the nonworking position 120 the spring nevertheless tends to urge the cutter back to the working position and is capable of drawing the cutting device back as soon as the obstruction is removed. In this respect it should also be noted that when the cutting device is cocked and is ready to be actuated, it can be caused to pivot into its nonworking position and still remain cocked by virtue of the close proximity of the end 121 of the catch 87 to rod 61 even when the catch is in the retracted position indicated at 107 and shown in FIG. 6. This has certain advantages in that even though the cutting device is caused to temporarily pivot into the nonworking position as the assembly moves along the top flight of the belt during the picking procedure, it can again assume the working position and be ready to be actuated without having to be cocked.

The actuated cutting devices are cocked by the cocking mechanism 28 of the fruit picking assembly. This mechanism includes an elongated tubular component 122 which more or less spans the length of the support flange. Tube 122 carries a solid metal shaft 123 which is adapted for axial movement in the tube. One end of the tube 122 houses a coiled spring 124 which is compressed between an end plug 125 in the tube and the adjacent end of the shaft 123. The other end of the shaft 123 projects beyond the tube end thereat and carries a roller 126 which is adapted to engage a cam 127 appropriately fixed in working alignment on the frame to encounter the roller as the assembly passes along the bottom flight 128 of the belt. The top portion of tube 122 has a longitudinally extending slot 129 to accommodate the location of a plurality of fingers 130 which are associated with the respective cutting devices of the assembly. Each finger has a vertical section 131 which extends through the slot 129 in tube 122 and which is fixed in a suitable hole in the shaft 123. The other section 132 of the finger extends forwardly to between the arms 67 and 77 of the cutting device associated with the finger and the end of the section 132 is arranged slightly above the support rod for the cutting devices. The finger sections 132 are normally located adjacent arms 67. When shaft 123 is moved in the direction of arrow 134 by virtue of the cam action, the fingers 130 engage the inside edges 88 of the pivot arm 77 of the uncocking cutting devices 60 and cause these arms to pivot against the urgings of the leaf springs until the pivot arms are again caught by the associated catches 87. This of course returns the cutting blades 74 of the cutters to their open positions in the arrangement. As is best indicated in FIG. 6, the forward side of each arm 77 is beveled in the area of the catch so as to enable the catch to bear against the surface thereat and to automatically retract as the arm 77 is caused to pivot by the cocking device into its cocked position.

The device for setting up the fingers of the fruit picking assembly includes a yoke 136 which has a back section 137 that spans the width of the belt at a suitable position for engaging the fingers when they are in the knocked down position. The side arms 138 of the yoke extend forwardly from the opposite ends of section 137 and these arms are pivotally connected at the end plates by means of aligned pivot elements 139. Here each of the side arms 138 has a rigid section that hangs down at the adjacent side edges 141 of belt 13. These arms or sections 140 are arranged to engage transversely aligned cams 142 at the opposite sides of the belt so as to cause the yoke to pivot and set up those fingers which have been knocked down during the prior cycle of the assembly. As the yoke is caused to pivot, transverse section 137 engages the fingers and forces the knocked down fingers of the assembly into their working position. As this happens the retainer springs 115 draw the cutting devices into their working position. It should be noted that cam 127 for the cocking mechanism 28 is engaged in a sequence of events that transpire as the assembly moves along the bottom flight of the belt after the fingers have been set up and the cutting devices have assumer their inclined working positions.

From the foregoing description it is evident that provision is made for sensing both the stem portion and the body portion of the tree attached citrus fruit and that the cutting device is actuated only when both portions of the tree attached fruit are simultaneously sensed by the detecting device. As such, when branches and other tree growth encounter the sensing elements the probabilities of depressing both sensing components at the same time to thus give a false detection of a tree attached fruit are small. As such, the cutting devices are actuated during use for all practical purposes only when fruit is trapped by the fingers and remains attached to the branched portion of the tree as the fingers advance through the growth area. It will also be apparent that the principles of the invention may be embodied in a fruit picking device having rigid or resilient finger components without departing from the spirit and scope of the invention.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a citrus fruit picking apparatus having a pair of spaced fingers arranged to trap tree attached citrus fruit therebetween, the improvement comprising the combination therewith of a detecting device for detecting tree attached citrus fruit, and a cutting device controlled in its actuation by the detecting device for severing the detected fruit from the tree.

2. In a citrus fruit picking apparatus having a pair of spaced fingers arranged to trap tree attached citrus fruit therebetween, the improvement comprising the combination in accord with claim 1 wherein the detecting device includes a first sensing component arranged to sense the body portion of the tree attached citrus fruit entrapped by the fingers, a second sensing component arranged to sense the stem portion of the tree attached citrus fruit entrapped by the fingers, said first sensing component and said second sensing component being operatively connected to cooperate in controlling the actuation of said cutting device.

3. In a citrus fruit picking apparatus having a pair of spaced fingers arranged to trap tree attached citrus fruit therebetween, the improvement comprising the combination in accord with claim 1 wherein the cutting device includes a rigid component having a blade implement movable between a first position and a second position for the implement, and resilient actuator means urging the implement into the second position, wherein the detecting device includes a catch retaining said implement in said first position by engagement with said rigid component, a first sensing component arranged to sense the body portion of the tree attached citrus fruit entrapped by the fingers, and a second sensing component arranged to sense the stem portion of the tree attached citrus fruit entrapped by the fingers, said catch and said rigid component being adapted and arranged to disengage in response to the simultaneous sensing of said body portion and said stem portion by the sensing components.

4. In a citrus fruit picking apparatus having a pair of spaced fingers arranged to trap tree attached citrus fruit therebetween, the improvement comprising the combination in accord with claim 1 wherein the cutting device includes a rigid component having a blade implement movable between a first position and a second position for the implement, and resilient actuator means urging the implement into the second position, wherein the detecting device includes a catch releasably retaining said implement in said first position by engagement with said rigid component, a first sensing component arrange to sense the body portion of the tree attached citrus fruit entrapped by the fingers, and a second sensing component arranged to sense the stem portion of the tree attached citrus fruit entrapped by the fingers, said catch and said rigid component being adapted and arranged to disengage in response to the simultaneous sensing of said body portion and said stem portion by the sensing components, thereby to permit said actuator to move said implement to said second position, said improvement further comprising cam actuated means for returning said implement from said second position to said first position therefore.

5. In a citrus fruit picking apparatus having a pair of spaced fingers arranged to trap tree attached citrus fruit therebetween, the improvement comprising the combination in accord with claim 1 wherein said cutting device includes a first rigid component having an edge, a second rigid component pivotally connected to said first rigid component; said second rigid component having a blade implement arranged to pivot between a first position and a second position therefore, and resilient actuator means urging the implement into the second position therefore, wherein said detecting device includes a catch releasably retaining said implement in said first position by engagement with said second rigid component, a first sensing component connected to said catch and arranged to sense the body portion of the tree attached citrus fruit entrapped by the fingers, said edge being adapted and arranged to sense the stem portion of the tree attached citrus fruit entrapped by the fingers and constituting a second sensing component of the detecting device, said catch and said second rigid component being adapted and arranged to disengage in response to the simultaneous sensing of said body portion and said stem portion by the sensing components.

6. A citrus fruit picking apparatus comprising a fruit picking assembly, and means for moving the assembly through crop laden branches of a citrus tree; said assembly including a support component, a pair of fingers mounted on said component, said fingers being spaced apart and arranged in working positions to cooperate in trapping fruit therebetween and each finger being pivotally movable out of its working position in the arrangement, resilient means yieldably retaining the fingers in their working positions in the arrangement, a cutting device supported on said component and arranged in a working position to cut the stem portion of fruit trapped by the fingers, means establishing an axis for pivotal movement of the device out of its working position, resilient means yieldably retaining the cutting device in its working position, and a detecting device for detecting tree attached fruit trapped by the fingers, said cutting device being controlled in its actuation by said detecting device.

7. A citrus fruit picking apparatus in accord with claim 6 wherein the detecting device includes a first sensing component arranged to sense the body portion of tree attached citrus fruit entrapped by the fingers, a second sensing component arranged to sense the stem portion of tree attached citrus fruit entrapped by the fingers, said first sensing component and said second sensing component being operatively connected to cooperate in controlling the actuation of said cutting device.

8. A citrus fruit picking apparatus in accord with claim 6 wherein the cutting device includes a rigid component having a blade implement movable between a first position and a second position for the implement, and resilient actuator means urging the implement into the second position; wherein the detecting device includes a catch retaining said implement in said first position by engagement with said rigid component, a first sensing component arranged to sense the body portion of tree attached fruit entrapped by the fingers, and a second sensing component arranged to sense the stem portion of tree attached fruit entrapped by the fingers, said catch and said rigid component being adapted and arranged to disengage in response to the simultaneous sensing of said body portion and said stem portion by the sensing components.

9. A citrus fruit picking apparatus in accord with claim 6 wherein the cutting device includes a rigid component having a blade implement movable between a first position and a second position for the implement, and resilient actuator means urging the implement into the second position; wherein the detecting device includes a catch releasably retaining said implement in said first position by engagement with said rigid component, a first sensing component arranged to sense the body portion of tree attached fruit entrapped by the fingers, and a second sensing component arranged to sense the stem portion of the tree attached fruit entrapped by the fingers; said catch and said rigid component being adapted and arranged to disengage in response to the simultaneous sensing of said body portion and said stem portion by the sensing components, thereby to permit said actuator to move said implement to said second position, said assembly further comprising cam actuated means for returning said implement from said second position to said first position therefore.

10. A citrus fruit picking apparatus in accord with claim 6 wherein the cutting device includes a first rigid component having an edge, a second rigid component pivotally connected to said first rigid component, said second rigid component having a blade implement arranged to pivot between a first position and a second position therefore, and resilient actuator means urging the implement into the second position therefore, wherein said detecting device includes a catch releasably retaining said implement in said first position by engagement with said second rigid component, a first sensing component connected to said catch and arranged to sense the body portion of the tree attached citrus fruit entrapped by the fingers, said edge being adapted and arranged to sense the stem portion of the tree attached citrus fruit entrapped by the sensing component and constituting a second sensing component of the detecting device, said catch and said second component being adapted and arranged to disengage in response to the simultaneous sensing of said body portion and said stem portion by the sensing components.

References Cited

UNITED STATES PATENTS

| | | | |
|---|---|---|---|
| 2,491,203 | 12/1949 | Orelind | 56—121.46 |
| 2,990,669 | 7/1961 | Klemm | 56—334 |
| 3,066,469 | 12/1962 | Chatagnier | 56—327 |
| 3,077,720 | 2/1963 | Grove et al. | 56—328 |
| 3,164,944 | 1/1965 | Polk | 56—338 |
| 3,200,575 | 8/1965 | Hurst | 56—328 |

RUSSELL R. KINSEY, *Primary Examiner.*